H. A. BROOKS.
LATHE CHUCK.
APPLICATION FILED JUNE 12, 1919.
1,378,319.
Patented May 17, 1921.
2 SHEETS—SHEET 1.
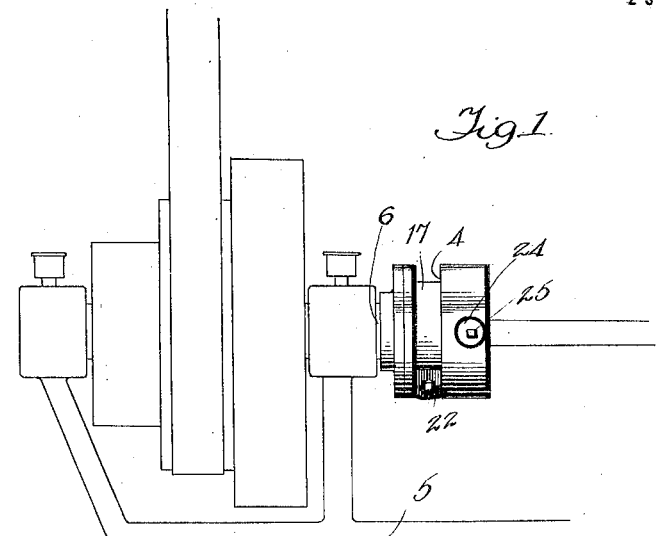
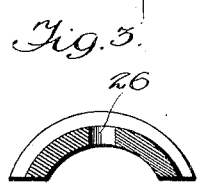
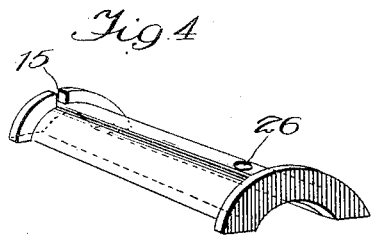
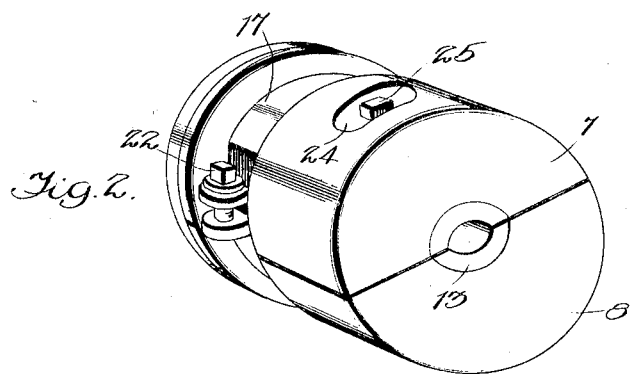
WITNESSES
George C. Myers.
INVENTOR
HUGH A. BROOKS,
BY
ATTORNEYS

H. A. BROOKS.
LATHE CHUCK.
APPLICATION FILED JUNE 12, 1919.

1,378,319.

Patented May 17, 1921.
2 SHEETS—SHEET 2.

WITNESSES
George C. Myers

INVENTOR
HUGH A. BROOKS,
BY
ATTORNEYS

UNITED STATES PATENT OFFICE.

HUGH A. BROOKS, OF BAINBRIDGE, GEORGIA.

LATHE-CHUCK.

1,378,319.  Specification of Letters Patent.  Patented May 17, 1921.

Application filed June 12, 1919. Serial No. 303,534.

*To all whom it may concern:*

Be it known that I, HUGH A. BROOKS, a citizen of the United States, and a resident of Bainbridge, in the county of Decatur and State of Georgia, have invented certain new and useful Improvements in Lathe-Chucks, of which the following is a specification.

This invention is an improvement in lathe chucks, the principal object of the invention being to provide a chuck in which the clamps for holding the work may quickly be interchanged for those of other sizes so that work of various sizes may easily and quickly be accommodated.

A further object is to provide a chuck made of two sections separably connected by means of a removable clamp, the work clamps being retained within each section of the chuck.

Another object is to provide means to prevent displacement of the work clamps relatively to the chuck.

A further object is to provide an improved lathe chuck which will be exceedingly simple, durable, efficient in operation and inexpensive to manufacture.

With these and other objects in view, which will become apparent as the description proceeds, the invention resides in the construction, combination and arrangement of parts hereinafter more fully described and claimed, and illustrated in the accompanying drawing in which like characters of reference indicate like parts throughout the several figures of which:

Figure 1 represents an elevational view of a portion of a lathe, the improved chuck being shown in place thereon.

Fig. 2 represents a perspective view of the chuck removed.

Fig. 3 represents a transverse section taken through one of the work clamps removed.

Fig. 4 represents a view in perspective of the work clamp which is shown in section in Fig. 3.

Figure 5:
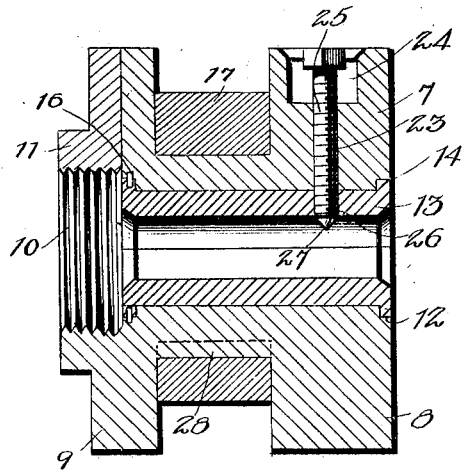
Fig. 5 represents a longitudinal sectional view of the chuck taken at right angles to the plane on which the chuck is divided.

Referring more particularly to the drawings, the lathe bed is indicated generally at 5, and the power driven shaft is indicated at 6. The chuck includes two semi-cylindrical sections 7 and 8 respectively, one of which, for instance, section 8, is formed integrally with, or is otherwise rigidly secured in suitable manner, to a face plate 9. The latter is of a diameter coincident to the diameter of the chuck. The face plate is in the form of a disk having a threaded central opening 10 provided through an annular flange 11 formed on the rear face of the plate. The plate is threaded onto the end of the shaft 6 whereby when the shaft is rotated the chuck will be rotated with the shaft.

The chuck is provided with an axial bore counter sunk at both ends as at 12, in which bore the work clamps 13 are arranged. These clamps are each semi-cylindrical in cross section, and come in various sizes for receiving work of various diameters. Each of the clamps at its ends is provided with outwardly extending flanges 14 which fit into the counter sunk portions 12 of the bore of the chuck, as clearly shown in Fig. 5. The inner ends of the work clamps, are each provided with a slot or recess 15 occurring in the flange of the clamp, and into the recesses extend dowel pins 16, carried each beween one of the sections of the chuck. These dowel pins are radially disposed, and are situated at points on the periphery of the countersunk inner end of the chuck bore, so as to readily fit into the recesses 15 of the clamps and thereby prevent rotary motion of the chuck head relatively to the clamps and vice versa.

Figure 6:
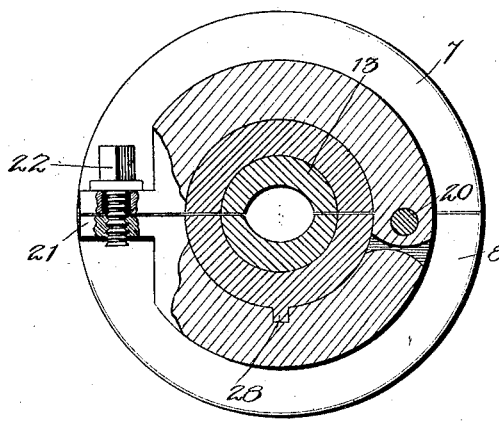
Fig. 6 represents a transverse sectional view, partially in elevation, taken through the chuck, showing the chuck clamp in position thereon.
Figure 7:
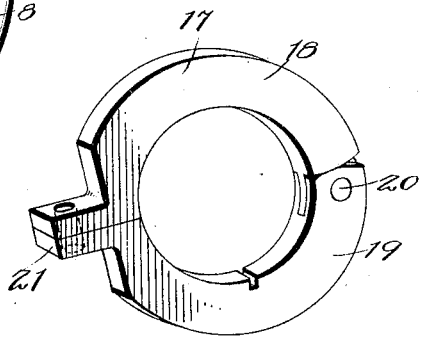
Fig. 7 represents a view in persepective of the chuck clamp removed.

The two sections of the chuck are detachably secured together through the medium of a chuck clamp 17. The latter, as clearly shown in Fig. 7, consists of two semi-circular sections 18 and 19, pivotally connected together at their inner ends as at 20 and at their outer ends being provided with off-set lugs 21 through which the set screw 22 may be threaded for drawing the ends of the clamp together in binding the sections of the chuck together. One of the lugs, that is the lowermost lug as shown in Fig. 6, is threaded for receiving the set screw, the other lug being provided with a plain bore of a diameter slightly greater than the diameter of the set screw whereby to allow a movement of the clamp sections in tightening the screw in place, without effecting a bind between the screw and the sections of the clamp, as will be readily understood.

The clamp is set in an annular groove 4 cut in the chuck, and the dimensions of the clamp are such that no part of it will project beyond the periphery of the chuck, and there will, therefore, be no danger of the person or clothing of the workman being struck by a protruding portion of the clamp as the chuck rotates.

The removable section 7 of the chuck, is provided with a radially threaded opening 23, counter sunk at its outer end as at 24 for receiving a set screw 25 whereby to bind the work in place in the chuck. This set screw is threaded throughout its entire length, and is of such length that adjustments of the set screw to accommodate work of various sizes may be accomplished, as will be understood. The set screw is headed at its outer end, the head being arranged within the counter sink 24, in position to be engaged by a wrench. The proportions of the screw are such that no part of it will project beyond the periphery of the chuck. The inner end of the screw passes through an opening 26 provided in the work clamp carried by the section 7 of the chuck, and the inner end of the screw is pointed as at 27 whereby to secure a purchase on the work and effectively bind the latter in position in the chuck.

The clamp is so positioned with respect to the set screw 25 that both are accessible from the same position of the chuck as indicated in Fig. 1, whereby each may be loosened or tightened without having to readjust the position of the chuck. In order to retain the clamp in a permanent position relatively to the chuck when it is put in place thereon, a key or lug 28 is provided in the bottom of the groove 4 and one of the clamp sections is provided with a recess which fits over this key, and thereby prevents displacement of the clamp relatively to the chuck during the operation of the device.

When it is desired to remove the work clamps and substitute others, the set screw 25 is backed off until it disengages the work, the set screw 22 is then backed off for disengaging the clamp. The latter is then removed and the section 7 may be lifted off, the desired work clamps substituted, and the chuck clamp then replaced and the set screw turned down to engage with the work. The work clamps may be separated from the sections of the chuck simply by lifting them off of the sections, the clamps being so proportioned with respect to the bore of the counter sunk ends thereof, as to have a snug fit against the sections of the chuck.

Although I have described the preferred embodiment of my invention, I may desire to make such changes in the construction, combination and arrangement of parts thereof, as do not depart from the spirit of the invention and the scope of the appended claim.

I claim:—

A chuck comprising a pair of semi-cylindrical sections having a center bore, said sections being provided with a peripheral groove, a clamp arranged within the groove for detachably binding the sections of the chuck together and a face plate formed integrally with one of the sections of the chuck and extending past the end of the other section and having an axially arranged threaded bore substantially as described.

HUGH A. BROOKS.